UNITED STATES PATENT OFFICE.

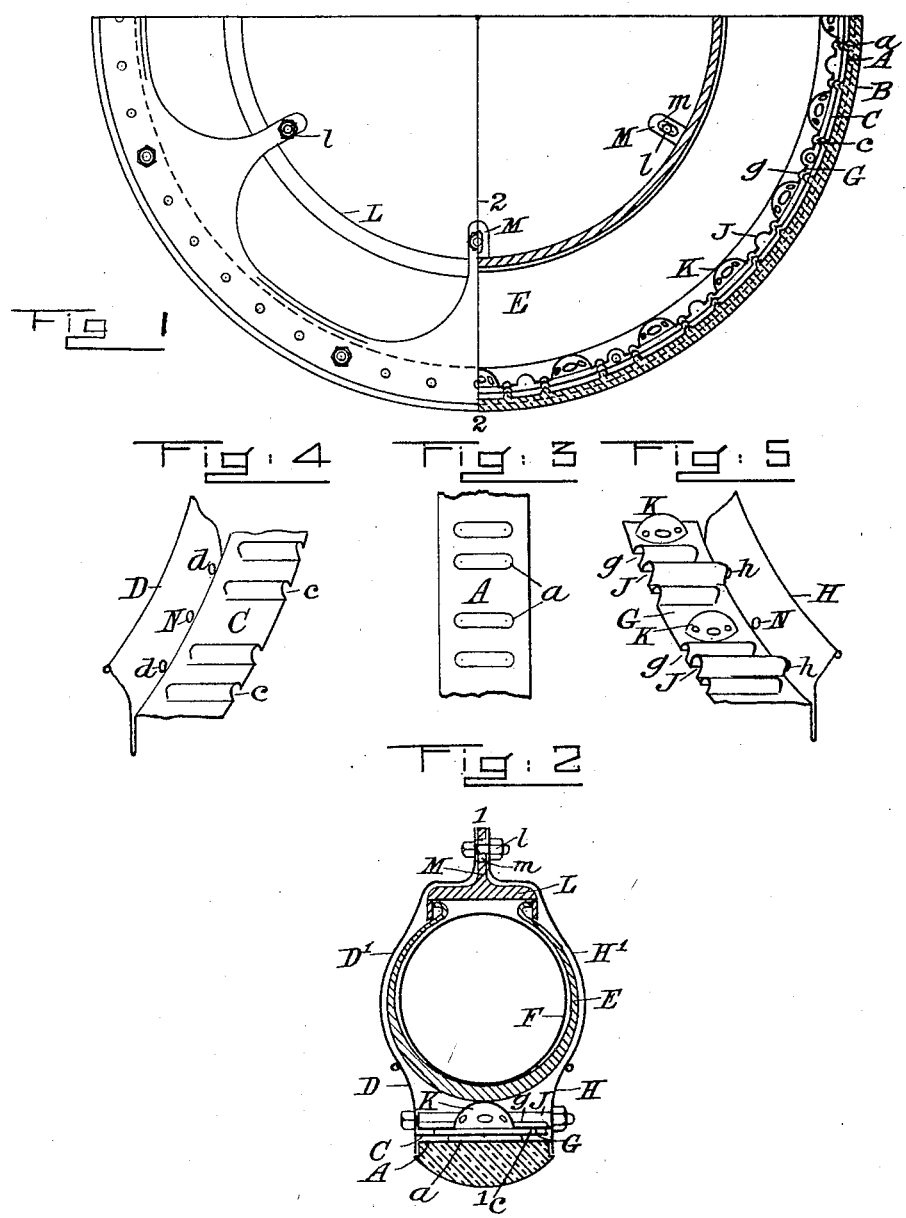

CHARLES FREDERICK FOX ALLAN, OF SYDNEY, NEW SOUTH WALES, AUSTRALIA.

PROTECTIVE COVERING FOR PNEUMATIC TIRES.

1,324,368.    Specification of Letters Patent.    Patented Dec. 9, 1919.

Application filed June 11, 1918. Serial No. 239,352.

*To all whom it may concern:*

Be it known that I, CHARLES FREDERICK FOX ALLAN, a subject of the King of Great Britain and Ireland, residing at 123/131 Castlereagh street, Sydney, New South Wales, Australia, have invented new and useful Improvements in Protective Coverings for Pneumatic Tires, of which the following is a specification.

This invention may be applied to all kinds of pneumatic tires, but it is specially applicable for use with motor cars.

There are three main parts in the protective covering, consisting of three wide, concentric, corrugated rings of thin metal; to the outer corrugated ring adheres a solid tire of suitable material, constituting the tread of the wheel. The inner and innermost corrugated rings are provided with side pieces, parts of each of which projects inward toward the center of the wheel so as to partially embrace the sides of the pneumatic tire, and part of each of which projects outward toward the periphery of the wheel so as to partially embrace the sides of the solid tire or tread. Means are provided for binding the parts together and for securing the protective covering in position over the pneumatic tire.

In the accompanying drawings:—

Figure 1 is a view of half a wheel to which the invention is applied, the left side being in elevation while the right side is in vertical section taken on the line 1—1 of Fig. 2.

Fig. 2 is a transverse vertical section of the invention, taken on the line 2—2 of Fig. 1.

Fig. 3 is a plan of a small segment of the outer ring straightened out, showing the disposition, in pairs, of the transverse corrugations.

Fig. 4 is a perspective view of a small segment of the inner corrugated ring, showing the transverse corrugations, in pairs, and the disposition of the side piece integral with the ring.

Fig. 5 is a perspective view of a small segment of the innermost corrugated ring, showing the transverse corrugations, in pairs, domes between the sets of pairs of corrugations, and the disposition of the side piece integral with the ring.

Figs. 4 and 5 are also suggestive of a mode whereby the inner and innermost rings, with their respective side pieces, may be made of sheet metal stamped and formed to the desired shape.

A is the outer ring of thin metal with transverse corrugations $a$, $a$, arranged in pairs as shown at Fig. 3. To the ring A is caused to adhere, in any appropriate manner, a solid tire or tread B, which may consist of rubber, fiber or other suitable material.

C is the inner ring, concentric with A and provided with transverse corrugations $c$, $c$, arranged in pairs, as shown at Figs. 1 and 4. Integral with the ring C is a side piece D part of which projects inward toward the center of the wheel in order to partly embrace one side of the covering E of the pneumatic tube F, and part of which projects outward toward the periphery of the wheel in order to partly embrace one side of the solid tire or tread B. When in position, the corrugations $c$, $c$, will engage with the corrugations $a$, $a$; thus, the two rings A, C, will be prevented from creeping independently of each other.

G is the innermost ring, concentric with A and C, and provided with transverse corrugations $g$, $g$, arranged in pairs, as shown in Figs. 1 and 5. Integral with the ring G is a side piece H, having the same function as the side piece D, being adapted to partly embrace one side of the covering E and one side of the solid tire or tread B, on the side of the wheel opposite to D. Between the corrugations $g$, $g$, in each pair, is a deeper and wider corrugation J. In line with the axes of the corrugations J, the side pieces D and H are pierced with holes $d$ and $h$, through which bolts may be passed, whereby the parts may be bound together and secured by nuts. In the blank spaces between the sets of pairs of corrugations $g$, are semispherical domes K that are more lofty than any of the corrugations; upon the summits of the domes K, the covering E of the pneumatic tube will rest, as shown in Figs. 1 and 2.

It is not necessary that the corrugations $c$, $g$, should extend quite across the full width of their respective rings; it will be sufficient if they be made sufficiently long to just allow the corrugations of the other ring with which they are engaged to lie beneath them; but the corrugations J must extend right across the ring G or bolts could not be passed through them.

The felly of the wheel is shown at L; at equal intervals, projecting radially from the felly toward the center of the wheel are flat studs M, down the centers of which are slots m. At similar intervals, the side pieces D, H, are extended radially toward the center of the wheel so as to form straps D', H', whereby the protective covering, as a whole, may be secured to the studs M, on the felly L, by means of bolts and nuts l. The protective covering, consisting of the three concentric rings, the solid tire or tread, and the side pieces, will thus be prevented from creeping around the pneumatic tire in either direction.

The side pieces D, H, and the straps D', H', should not fit too closely to the covering E of the pneumatic tube, but should be allowed a certain amount of play so that the resilience of the pneumatic tire may not be impaired. The connections between the auxiliary rim or outer ring A and the rim or felly member L of the wheel are spaced from the pneumatic tire at all times the contact between the auxiliary rim and the pneumatic tire being only at the points where the protuberances engage the tread of the tire, and the slots m in the studs on the felly will be of assistance in this respect. An allowance for play is shown in Fig. 2.

Besides the holes d, h, in the side pieces D, H, through which the securing bolts will be passed, the side pieces will be pierced at regular intervals with a series of holes N through which air may enter the protective covering; the domes K, will also be pierced with holes, to allow air to circulate.

The inner and innermost rings C, G, with their respective side pieces, may be made by any suitable method known to engineering science, but a convenient mode is suggested by the sketches at Figs. 4 and 5, whereby the parts may be stamped out of sheet metal and then bent and shaped to the desired form.

When the protective covering is to be installed in position, the corrugated ring A, with its solid tire or tread B, will be loosely placed around the pneumatic tire, the inner and innermost rings being forced in from the sides, so that the sets of pairs of corrugations on each ring shall engage with the sets of pairs of corrugations on the adjacent outer ring; the side pieces will then be bolted together by bolts passing through the corrugations J and the side pieces D, H; the straps will then be bolted to the studs M and thus the several parts, viz: the three concentric corrugated rings, with the solid tire or tread, and the side pieces will be secured together so that they shall form a ring around and a protective covering to the pneumatic tire, without in any way impairing the resilience of the pneumatic tube.

The side pieces D' and H' and the connecting bolt form rim embracing yokes. The annular series of spaced convex or dome shaped protuberances K maintain the pneumatic tire in spaced relation with the body of the annular protective covering and when a wheel encounters an inequality of a road the dome shaped protuberances at the bottom portion of the wheel will indent slightly the tread of the pneumatic tire around a considerable portion of the same so that instead of having a localized compression of the tire at the bottom of the wheel the compression will be distributed over a relatively large surface of the tread of the tire by means of a plurality of indentations produced by the dome shaped protuberances and as a result of this action only very little relative inward movement of the protective covering is required in the cushioning action of the pneumatic tire and only a small amount of play is necessary at the slots m to permit such action. It has been found in practice with a full sized automobile wheel that the amount of inward movement of the protuberances in indenting the pneumatic tire is approximately $\frac{3}{16}$ of an inch and the slots m will be of sufficient width to allow such play.

I claim:—

1. In combination, a pneumatic tire, a ring surrounding the tire and having projections formed on its periphery, a solid tire secured to said ring, a second ring interposed between said pneumatic tire and ring and formed with corresponding depressed portions to receive said projections, a third ring interposed between said second ring and the pneumatic tire and formed with channels to receive said depressed portions, said third ring being provided with spaced dome shaped inwardly projecting protuberances fitting against the tread of the pneumatic tire and adapted to produce slight indentations in the same around a considerable portion thereof, centrally of the tread, whereby excessive local compression of the pneumatic tire is prevented and converted into tread vibrations, and means for connecting the rings with the pneumatic tire, the connecting means between the solid tire and the pneumatic tire being spaced from the sides of the pneumatic tire at all times and the contact between the said tires being only at the points where the protuberances engage the tread of the pneumatic tire.

2. In combination, a rim, a pneumatic tire thereon, a ring surrounding the tire and having projections formed on its inner periphery, a solid tire carried by said ring, a second ring interposed between said pneumatic tire and ring and formed with corresponding depressed portions to receive said projections, a third ring interposed between said second ring and the pneumatic tire and formed with channels to receive said depressed portions, spaced inwardly projecting dome shaped protuberances carried by the third ring and fitting against the tread of the pneumatic tire and adapted to produce slight indentations therein around a considerable portion of the same to eliminate excessive local compression of the pneumatic tire, flanges formed on the second and third rings and partly embracing the pneumatic tire, straps carried by the flanges and studs formed on said rim and having a loose connection with the straps, the connecting means between the solid tire and the pneumatic tire being spaced from the sides of the pneumatic tire at all times and the contact between the said tires being only at the points where the protuberances engage the tread of the pneumatic tire.

In testimony whereof I have signed my name to this specification in the presence of two subscribing witnesses.

CHARLES FREDERICK FOX ALLAN.

Witnesses:
  R. MASSEY,
  H. C. CAMPBELL.